Patented May 4, 1937

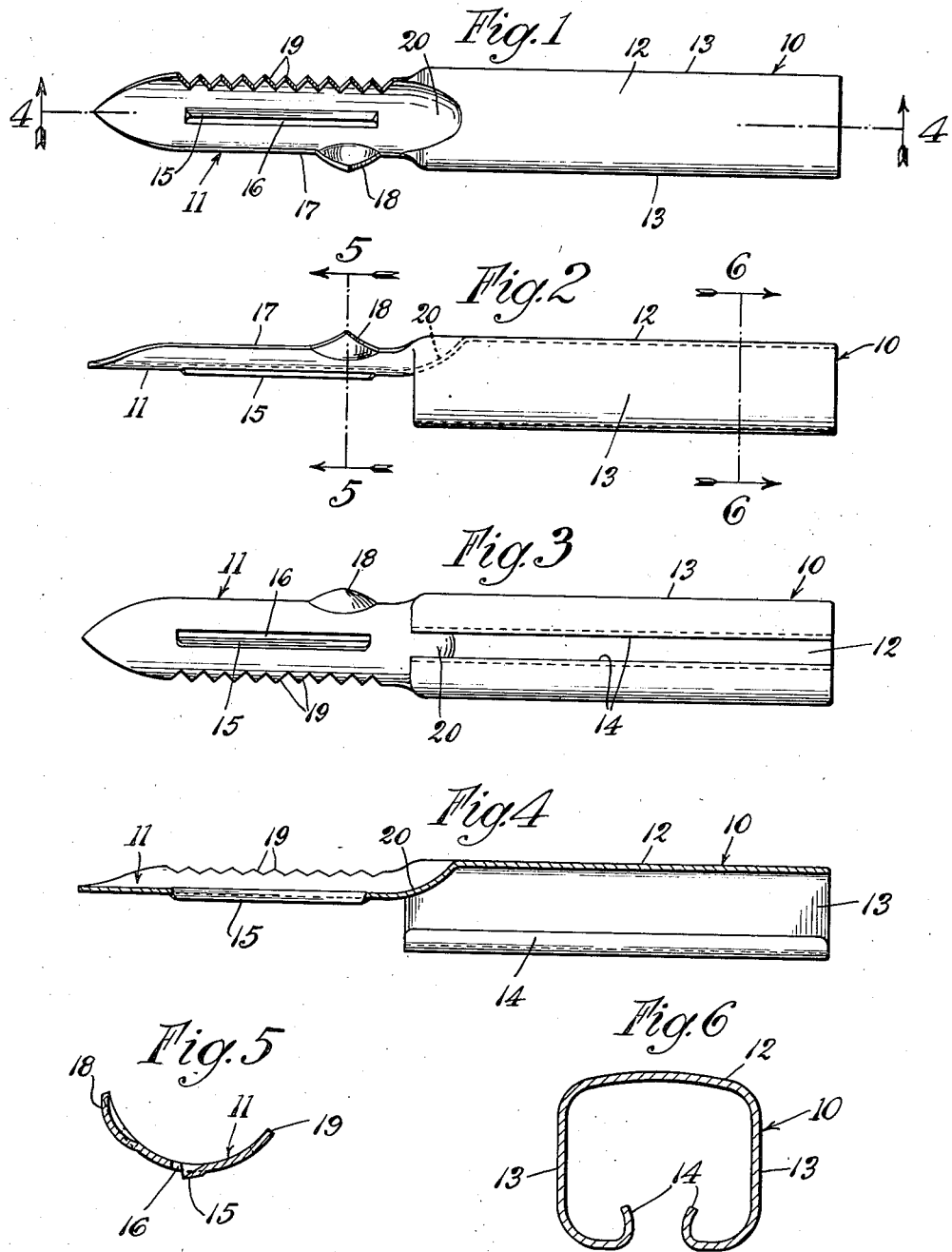

2,079,496

UNITED STATES PATENT OFFICE 2,079,496

PARING AND CORING TOOL

Lawrence C. Domack, Elmwood Park, Ill.

Application December 19, 1934, Serial No. 758,191

2 Claims. (Cl. 146—204)

This invention relates to improvements in paring and coring tools.

One object of the invention is to provide a tool for kitchen use which is provided with a scoop for removing eyes and specks from potatoes or other vegetables or fruit, which scoop is so located as to form no obstruction while the tool is being used in paring or coring.

A further object of the invention is to provide a paring and coring tool having a paring edge, an eye scoop, and a coring edge so arranged that no one of the same interferes with the functioning of the other, yet are so related that paring, coring, or removal of eyes or specks can be accomplished with facility.

A further object of the invention is to provide a one-piece tool for paring, coring and scooping out eyes or specks of vegetables or fruit, which can be kept in clean and sanitary condition with little effort in that there are no parts to absorb water or crevices within which food particles can accumulate.

In the accompanying drawing:

Figure 1 is a top plan view of a tool embodying the present improvements.

Figure 2 is a side elevation thereof.

Figure 3 is a bottom plan view of the same.

Figure 4 is a longitudinal section taken on line 4—4 of Figure 1.

Figure 5 is an enlarged transverse section taken on line 5—5 of Figure 2.

Figure 6 is an enlarged transverse section through the handle taken on line 6—6 of Figure 2.

In the drawing, 10 indicates generally the handle of the improved tool and in the form shown is a sheet metal structure integral with the blade, which is indicated generally by the numeral 11. As shown in Figure 6, the handle has a top wall 12 preferably slightly convex, and side walls 13, the margins of which are extended toward each other on the bottom of the handle and turned or folded inwardly as at 14.

The blade 11 is curved in cross section, and in the form shown is integral with the top wall 12 of the handle. As shown in Figures 2 and 4 the blade 11 extends from one end of the handle 10 and is disposed above a horizontal plane passing centrally through the side walls 13. Extending from the convex side of the blade is a cutting edge 15. The cutting edge is formed by pressing the metal of the edge downwardly as shown in Figure 5, and thereafter preferably grinding the same to provide a satisfactory cutting edge. Forwardly of the cutting edge 15 is a slot 16 formed by removal of a narrow strip of metal to provide an opening through which the peels of fruit or vegetables may pass during the paring operation.

On the forward edge 17 of the blade adjacent the rear thereof is a scoop 18 for removing eyes or specks from potatoes or other vegetables or fruit. As illustrated, the scoop is slightly concave but conforms generally to the curvature of the blade 11. This enables eyes and specks to be removed from the vegetables or fruit by substantially a rotary movement of the tool. By forming the scoop on one of the margins of the blade, as mentioned, it is disposed at an elevation above the surface of an article being pared, as will be seen, and thus does not constitute an obstruction to the free use of the device in paring.

On the opposite margin of the blade 11 serrations or teeth 19 are provided, which constitute the coring edge of the device. Thus in coring an apple or the like, the blade is pressed into the same and rotated with the teeth 19 in advance. It will be seen that during such rotation in the coring operation the cutting edge 16 and the eye scoop 18 do not cut away needlessly any of the material of the fruit or vegetable. The blade 11 as stated is preferably constructed integral with the top wall 12 of the handle, and in the manufacture of the tool a concavity 20 preferably is provided in the forward end of the wall 12 which margin gradually merges into the blade 11, and thus forms a rigid construction.

As stated above, the blade is disposed above a horizontal plane passing centrally through the side walls 13 of the handle. The cutting edge 16 extends below the concave surface of the blade and lies preferably within the said central plane. By this arrangement the cutting edge occupies the same relative position with respect to the handle of the improved tool that the cutting edge of a paring knife occupies with reference to the handle thereof. By this construction the user has little difficulty in familiarizing himself with the use of the tool as distinguished from prior art devices where the concave blade is arranged substantially concentric with reference to the handle.

By providing a handle which is substantially rectangular in cross section, a suitable grip for the hand is provided which prevents slipping of the handle in the hand during coring or scooping operations.

As illustrated in the drawing, the eye scoop 18 is disposed adjacent the forward end of the handle and preferably is formed integral with the forward longitudinal edge of the blade 11.

The location of the eye scoop adjacent the forward end of the handle enables the user, by simple movement of the wrist and without necessarily altering his grip upon the handle, to scoop out specks or eyes with greater facility than if the scoop were located at the forward end of the blade.

The integral metal construction of the blade and hollow handle provides a tool which can be kept in sanitary condition since water can be run through the handle to remove particles which accumulate during use. The longitudinal slot in the bottom of the handle formed by the inwardly turned edges 14, provides access for cleansing purposes and also resists twisting within the hand during use.

While I have shown and described an embodiment of my improvements for the purpose of illustration, I do not wish to be restricted specifically thereto except as so limited by the appended claims.

I claim:

1. A paring and coring tool comprising a handle having a blade curved in cross section, a forwardly projecting longitudinal paring edge extending below the convex surface of the blade, an eye scoop on the rear portion of the forward margin of the blade projecting upwardly therefrom and conforming generally to the curvature of the blade whereby said cutting edge and scoop are arranged for cutting and scooping action respectively only when said tool is moved with the forward margin of the blade in advance, and a coring edge at the rear margin of the blade operative only when said blade is moved with said rear edge in advance whereby said cutting edge and scoop are inoperative as the blade is rotated with the coring edge in advance.

2. A paring tool comprising a sheet metal handle having an upper wall and side walls, said side walls having extensions directed toward one another to form a bottom wall for the handle, all said walls defining a hollow integral handle structure, the top wall of said handle having a concave stiffening portion in the forward end thereof, and a blade concavo-convex in cross section integral with and forming a continuation of said concave stiffening portion and provided with a cutting edge on the convex side thereof disposed in a plane intermediate the upper and lower walls of the handle.

LAWRENCE C. DOMACK.